United States Patent
Travis et al.

(10) Patent No.: US 8,477,261 B2
(45) Date of Patent: Jul. 2, 2013

(54) SHADOW ELIMINATION IN THE BACKLIGHT FOR A 3-D DISPLAY

(75) Inventors: Adrian Travis, Seattle, WA (US); Neil Emerton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 12/954,059

(22) Filed: Nov. 24, 2010

(65) Prior Publication Data

US 2011/0292321 A1 Dec. 1, 2011

Related U.S. Application Data

(60) Provisional application No. 61/348,583, filed on May 26, 2010.

(51) Int. Cl.
*G02F 1/1335* (2006.01)
(52) U.S. Cl.
USPC .............................................. 349/65; 349/117
(58) Field of Classification Search
USPC ..................................... 349/61–65, 117–121
See application file for complete search history.

(56) References Cited

U.S. PATENT DOCUMENTS

| | | | |
|---|---|---|---|
| 6,196,691 B1 | 3/2001 | Ochiai | |
| 6,300,986 B1 | 10/2001 | Travis | |
| 6,608,961 B2 | 8/2003 | Travis | |
| 6,847,488 B2 | 1/2005 | Travis | |
| 7,101,048 B2 | 9/2006 | Travis | |
| 7,401,920 B1 | 7/2008 | Kranz et al. | |
| 7,463,315 B2 | 12/2008 | Chang | |
| 2006/0132423 A1 | 6/2006 | Travis | |
| 2007/0109811 A1 | 5/2007 | Marcellinus et al. | |
| 2010/0134522 A1 | 6/2010 | De Rijck | |
| 2012/0038850 A1* | 2/2012 | Hao et al. | 349/62 |
| 2012/0327332 A1* | 12/2012 | Yagi et al. | 349/65 |

FOREIGN PATENT DOCUMENTS

JP 11-160699 A 6/1999

OTHER PUBLICATIONS

International Search Report & The Written Opinion of the International Searching Authority dated Feb. 9, 2012, International Patent Application No. PCT/US2011/037016.
English Abstract of JP Publication No. JP11-160699 published on Jun. 18, 1999.
Travis, A.R.L., "Autostereoscopic 3-D display," Applied Optics, vol. 29, No. 29, pp. 4341-4343, Oct. 10, 1990.
Travis, A.R.L., et al., "Collimated light from a waveguide for a display backlight," Optics Express, vol. 17, No. 22, pp. 19714-19719, Oct. 15, 2009.
Weber, et al., "Giant Birefringent Optics in Multilayer Polymer Mirrors," Science, vol. 287, pp. 2541-2456, Mar. 31, 2000.
Toyama, Kentaro, et al., "Probabilistic Tracking in a Metric Space," Eighth International Conference on Computer Vision, Vancouver, Canada, vol. 2, Jul. 2001, 8 pages.

* cited by examiner

*Primary Examiner* — Edward Glick
*Assistant Examiner* — David Chung
(74) *Attorney, Agent, or Firm* — Vierra Magen Marcus LLP

(57) ABSTRACT

A light guide device can provide a backlight for an LCD or a projection display. The light guide device includes a light-input end and an opposing end, opposing left and right sides which join the light-input end and the opposing end, and opposing front and back surfaces which join the light-input end and the opposing end. A birefringent film is provided on the opposing left and right sides of the light guide which switches a polarization of incident light. Incident light is provided at the light-input end having a right-handed circular polarization, in addition to light having a left-handed circular polarization. Light emitted from the front surface passes through a linear polarizer which selectively passes light to allow privacy of viewing by a user. The incident light can be provided at the light-input end using one or more cuboid rods, slab light guides, or discrete light sources.

20 Claims, 10 Drawing Sheets

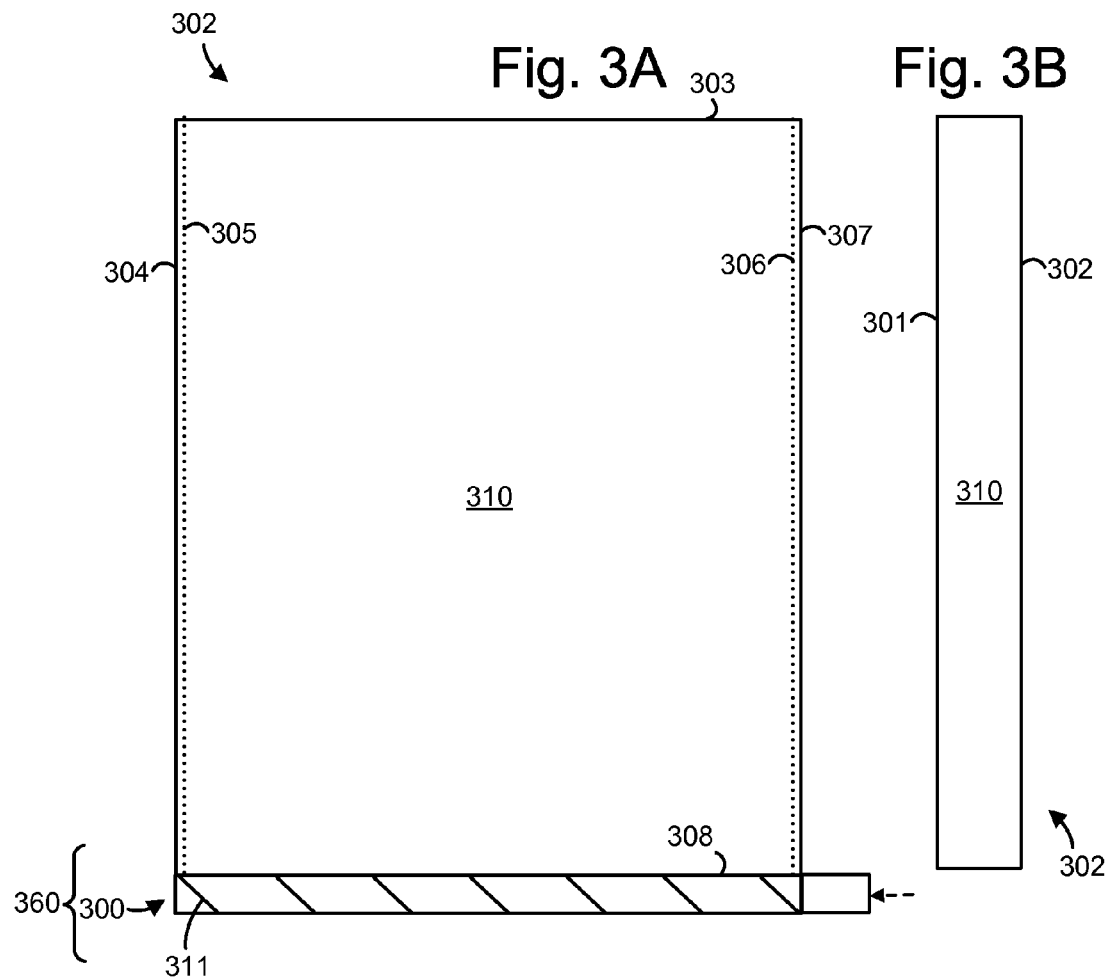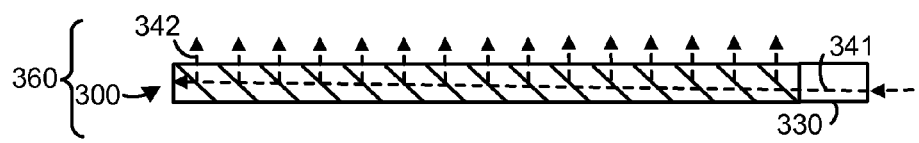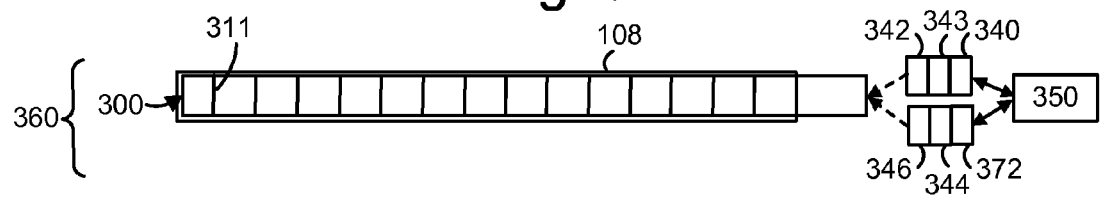

Fig. 3D2
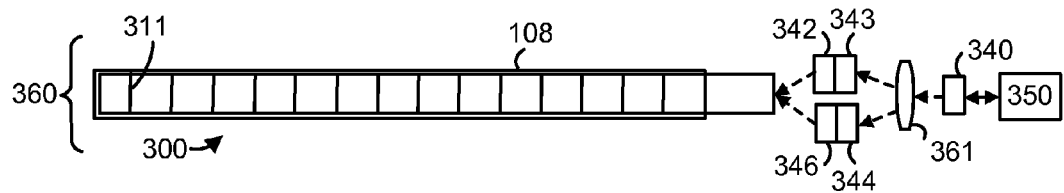
Fig. 3E
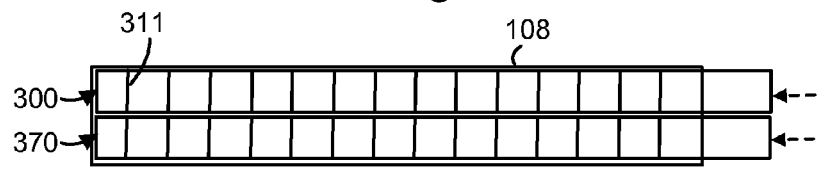
Fig. 3F
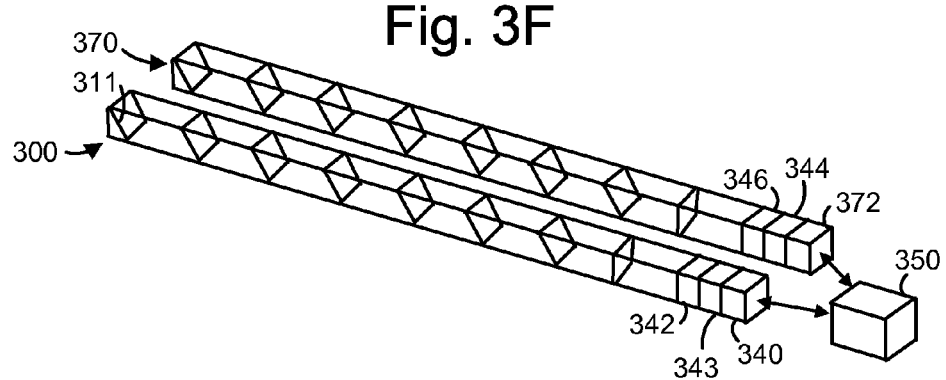
Fig. 3G
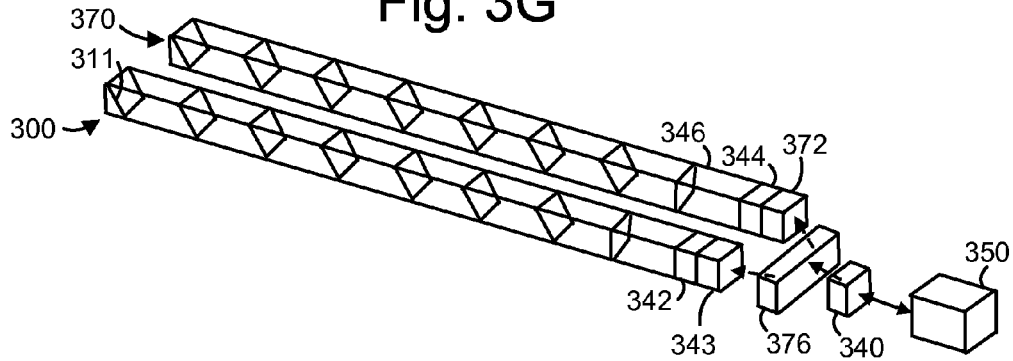

Fig. 4B1

Fig. 4B2     Fig. 4C     Fig. 4D
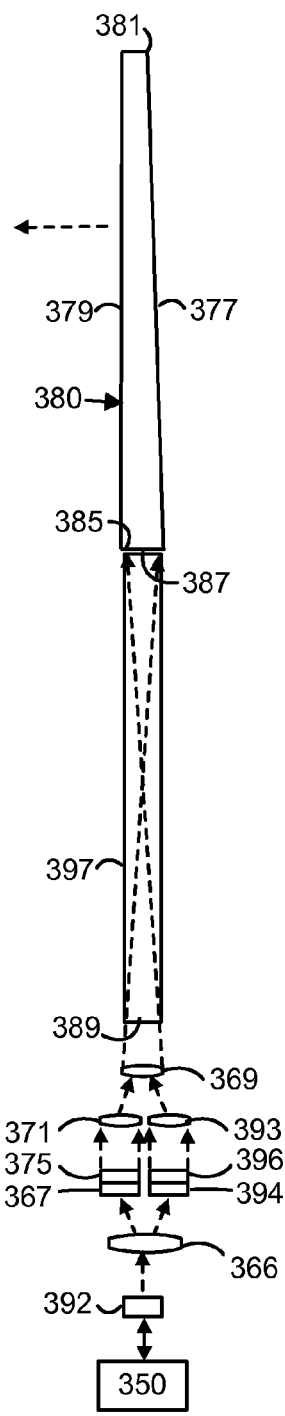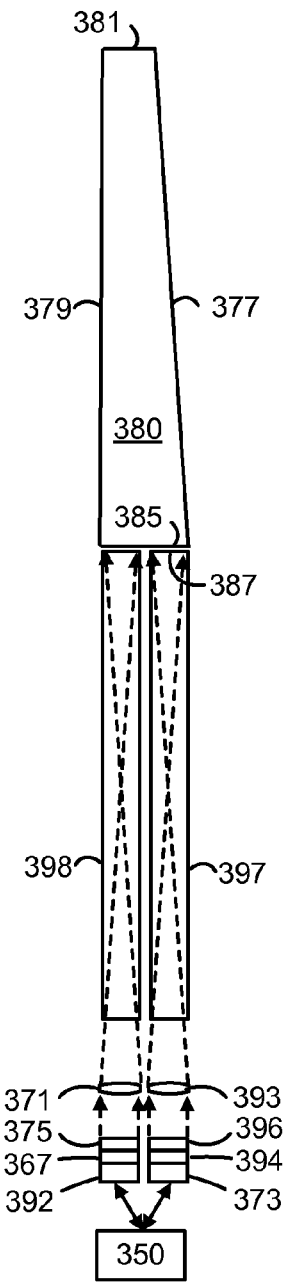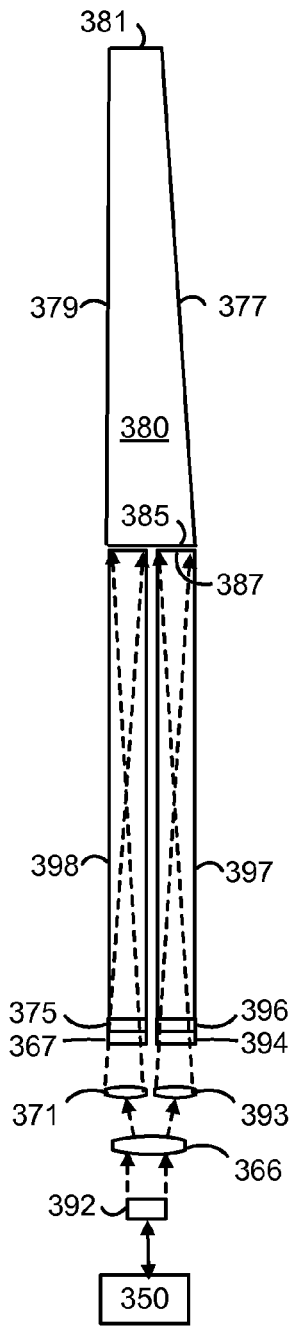

SHADOW ELIMINATION IN THE BACKLIGHT FOR A 3-D DISPLAY

CROSS-REFERENCE TO RELATED APPLICATIONS

This application claims the benefit of U.S. provisional patent application No. 61/348,583, filed May 26, 2010, incorporated herein by reference.

BACKGROUND

A light guide can be used to transport light for illumination. For example, a light guide can be used as the backlight, e.g., of a liquid crystal display (LCD) in many applications, including computer monitors, television, instrument panels, aircraft or marine craft cockpit displays, signage, and consumer devices such as video players, gaming devices, clocks, watches, calculators, still picture cameras, video cameras, mobile/cell phones and other telephones. Moreover, scanning backlights are slim backlights which emit collimated rays whose direction of collimation can be scanned. A light guide can also be used to provide a projection display, such as in head-mounted displays which are used in various applications, including military, aviation, medicine, video gaming, entertainment, sports, and so forth. See-through head-mounted displays allow the user to observe the physical world around him or her, while optical elements add light into the user's visual path, to provide an augmented reality image. However, it is difficult to provide uniform illumination for such light guides.

SUMMARY

A light guide device is provided which is uniformly illuminated. One possible configuration includes a planar light guide with an output surface and an input edge. At either side of the input edge are two side edges which are configured simultaneously to reflect incident rays and to change their polarization state to the orthogonal form. Two orthogonally polarized light sources are set up at the input edge such that light from one source travels towards an opposite side edge versus light from the other but the angle of convergence to each side-edge is the same as resolved in the plane of the light guide. A polarizer is placed against the output surface and oriented to pass light from one source only if it does not reflect off one of the sides, and to pass light from the other source only if it does reflect off one of the sides.

In one embodiment, the light guide device includes a light guide having a light-input end and an opposing end, opposing left and right sides which join the light-input end and the opposing end, and opposing front and back surfaces which join the light-input end and the opposing end. Further, a birefringent film is provided on the opposing left and right sides of the light guide which switches a polarization of incident light.

The light guide device further includes input components adjacent to the light-input end. The input components provide light with a first polarization to the light-input end and light with a second polarization, orthogonal to the first polarization, to the light-input end.

For example, the first polarization can be right-handed circular polarization, the second polarization can be left-handed circular polarization, and the birefringent film can switch incident light with the right-handed circular polarization to left-handed circular polarization, and switch incident light with the left-handed circular polarization to right-handed circular polarization.

In one approach, the input components include first and second sets of discrete light sources. In another approach, the input components include first and second transparent rods adjacent to the light-input end. In another approach, the input components include first and second slab light guides adjacent to the light-input end.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 3A depicts a light guide device which includes a rectangular light guide, and input components 360 which include one or more transparent rods.

FIG. 3B depicts a cross-sectional view of the light guide of FIG. 3A, showing the front surface 301 and the opposing rear surface 302.

FIG. 3C depicts light rays in a transparent rod of FIG. 3A.

FIG. 3D1 depicts an end view of the light guide device of FIG. 3A, showing one transparent rod and two light sources.

FIG. 3D2 depicts an end view of the light guide device of FIG. 3A, showing one transparent rod and one light source.

FIG. 3E depicts an end view of the light guide device of FIG. 3A, showing two transparent rods.

FIG. 3F depicts a perspective view of the two transparent rods of FIG. 3E, showing a separate light source for each rod.

FIG. 3G depicts a perspective view of the two transparent rods of FIG. 3E, showing a single light source for both rods.

FIG. 4B1 depicts a cross-sectional view of the light guide device of FIG. 4A, where one rectangular slab with two light sources are provided.

FIG. 4B2 depicts a cross-sectional view of the light guide device of FIG. 4A, where one rectangular slab with one light source is provided.

FIG. 4C depicts a cross-sectional view of the light guide device of FIG. 4A, where two rectangular slabs with respective light sources are provided.

FIG. 4D depicts a cross-sectional view of the light guide device of FIG. 4A, where two rectangular slabs with a single light source are provided.

DETAILED DESCRIPTION

As mentioned at the outset, light guides are commonly used in applications such as a backlight for an LCD and to provide a projection display. In a comparative implementation, the back light receives unpolarized light at the input and the geometry of the light guide causes the light to be emitted in a collimated manner, still unpolarized.

In an advancement provided herein, light which is input to the light guide is polarized, and a polarization switching material is used within the light guide to cause the light to be emitted from a face of the light guide in a collimated manner. An advantage of this approach over light guides which emit light in all directions is that less power is needed to make visible to a user the image on a LCD placed in front of the backlight. Furthermore the user has privacy because no one can see the display but them. Additionally the direction of collimation can be scanned so that illumination can continually be directed to the user's eyes as they move around, and separate images can be displayed in turn to each eye so that the user sees an autostereoscopic (3-D) image, such as in the manner explained in Travis, A. R. L., "Autostereoscopic 3-D display," Applied Optics 29, pp. 4341 to 4343, 10 Oct. 1990, incorporated herein by reference.

Figure 1A:
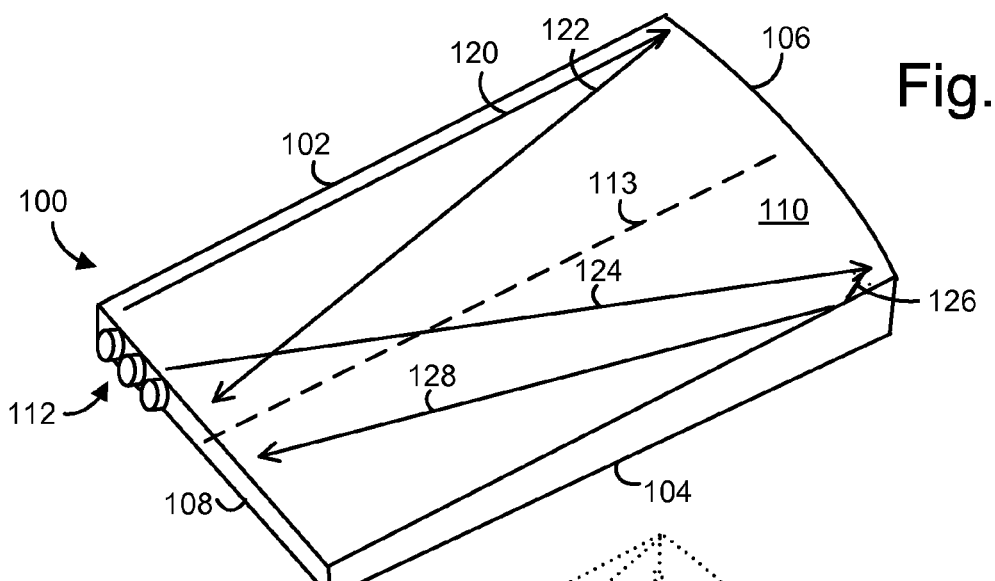
FIG. 1A depicts a perspective view of an example light guide having a curved reflective end, showing rays of light from a light source at a left side of the light-input end of the light guide.

FIG. 1A depicts a perspective view of an example light guide having a curved reflective end, showing rays of light from a light source at a left side of the light-input end of the light guide. The light guide 100 includes a light-input end 108 and an opposing reflective end 106, a front surface or face 110 and an opposing rear surface of face (111 in FIG. 2B), and opposing edge surfaces 102 and 104 which are provided with a polarization switching material such as a birefringent film. The light guide 100 can be made of a transparent material such as glass or a transparent thermoplastic such as polymethyl methacrylate (PLEXIGLAS®). In the one approach, the light guide 100 does not include a diffraction grating. The birefringent film can be provided by coating the opposing edge surfaces 102 and 104 with one or more layers of uniaxially birefringent film, such as discussed in Weber et al., "Giant Birefringent Optics in Multilayer Polymer Mirrors," Science, vol. 287, p. 2451-2456, Mar. 31, 2000, incorporated herein by reference, with the axis of birefringence perpendicular to the edge. Weber et al. state that multilayer mirrors that maintain or increase their reflectivity with increasing incidence angle can be constructed using polymers that exhibit large birefringence in their indices of refraction.

A multi layer birefringent film or mirror on the sides of the light guide would likely be appropriate, and can be made using techniques available to those skilled in the art, including the techniques discussed in Weber et al. Software tools are also available for designing the film. This film switches the polarization state of incident light when it is reflected. For example, the birefringent film can switch a right-handed circular polarization of incident light to a left-handed circular polarization, and switch a left-handed circular polarization of incident light to a right-handed circular polarization. In one possible implementation, the light guide 100 is wedged-shaped and the reflective end 106 is curved and has a Fresnelated surface (see FIG. 2A) to reflect incident light back toward the light-input end 108. Generally, in a wedge shaped light-guide with a curved reflective end, un-collimated light which enters the light-input end fans out within the wedge itself, then reflects off the thick, curved end in a collimated manner. This type of light guide is more compact and easier to mold than some other approaches, although the curved mirror can introduce a lens aberration.

An axis 113 of the light guide is along the meridional plane (a plane that includes the optical axis) of the light guide. The meridional plane is parallel to the edges 102 and 104 in one approach. Additionally, the edges 102 and 104 may be at a right angle to the light-input end 108, in addition to being parallel to one another. When the light guide 100 is wedged-shaped, the front and back surfaces are at a small angle to one another, such as depicted in FIG. 2B.

To understand the operation of the light guide, consider example discrete light sources 112 which inject light into the left side of the light-input end 108. Light from these light sources, including light rays 120 and 124, reaches the reflective end 106 and reflects back, as indicated by example light rays 122, 126 and 128. Due to this reflection pattern, a region 134 (a reflection region) of the light guide receives the reflected light, while a region 132 (a shadow region) does not receive the reflected light and therefore has a lower illumination (see FIG. 1B).

Figure 1B:
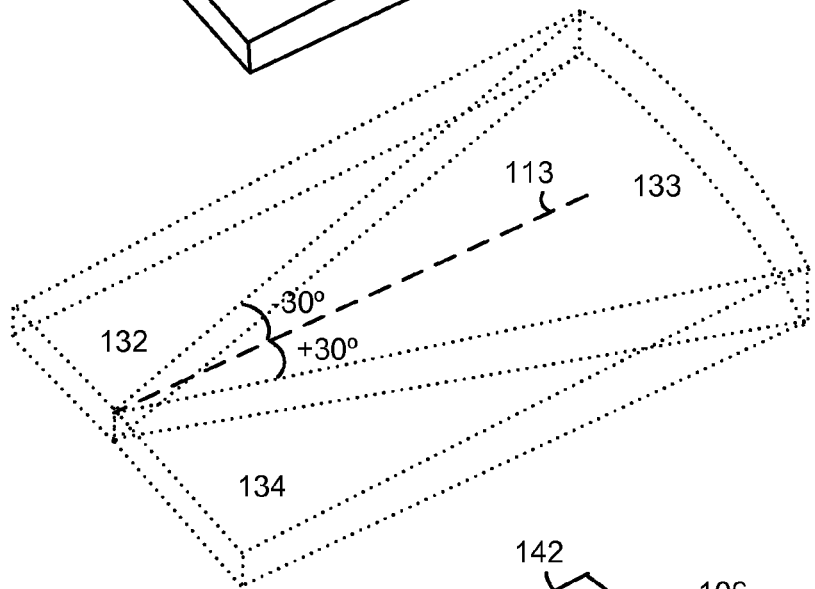
FIG. 1B depicts the light guide configuration of FIG. 1A, showing a shadow region and a reflection region.

FIG. 1B depicts the light guide configuration of FIG. 1A, showing a shadow region and a reflection region. As an example, the region 132 can be a shadow region at an azimuthal angle of less than −30 degrees to a perpendicular to the light-input end (e.g., from −30 to −90 degrees) and the region 134 can be a reflection region at an azimuthal angle of greater than +30 degrees to a perpendicular to the light-input end (e.g., from 30 to 90 degrees). This perpendicular can be the axis 113 or a line which is parallel to the axis 113.

Figure 1C:
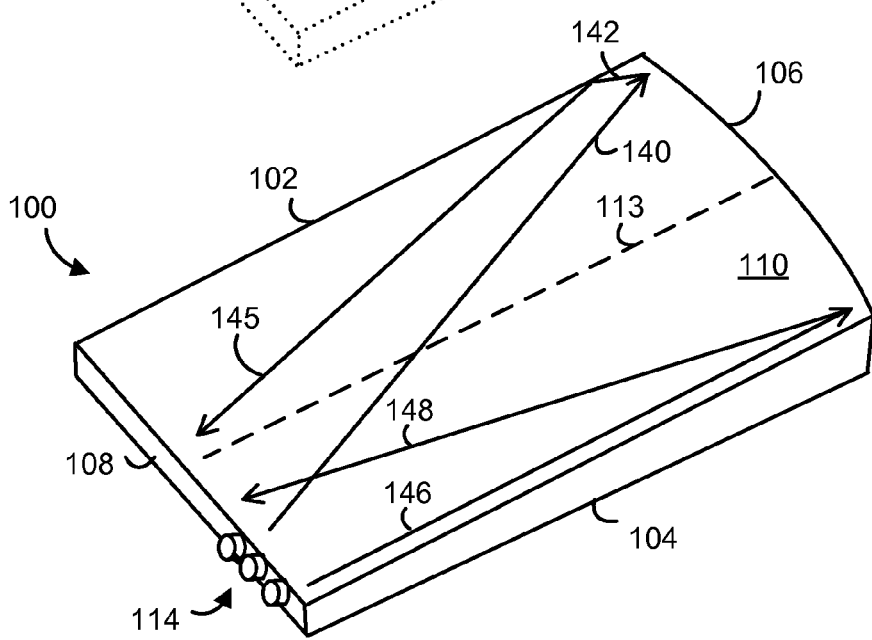
FIG. 1C depicts a perspective view of the light guide of FIG. 1A, showing rays of light from a light source at a right side of the light-input end of the light guide.

FIG. 1C depicts a perspective view of the light guide of FIG. 1A, showing rays of light from a light source at a right side of the light-input end of the light guide. Here, consider example discrete light sources 114 which inject light into the right side of the light-input end 108. Light from these light sources, including light rays 140 and 146, reaches the reflective end 106 and reflects back, as indicated by example light rays 142, 145 and 148. Due to this reflection pattern, the region 132 of the light guide (FIG. 1B) receives the reflected light and acts as a reflection region, while the region 134 does not receive the reflected light and therefore acts as the shadow region. Thus, the shadow region is region 134 and the reflection region is region 132.

On the other hand, when light sources are provided on both sides of the light-input end 108, the shadow regions can essentially be eliminated since reflections exist on both sides of the light guide (regions 132 and 134 are both reflection regions). A central region 133 of the light guide generally does not include lower illumination regions and is therefore well illuminated.

Figure 2A:
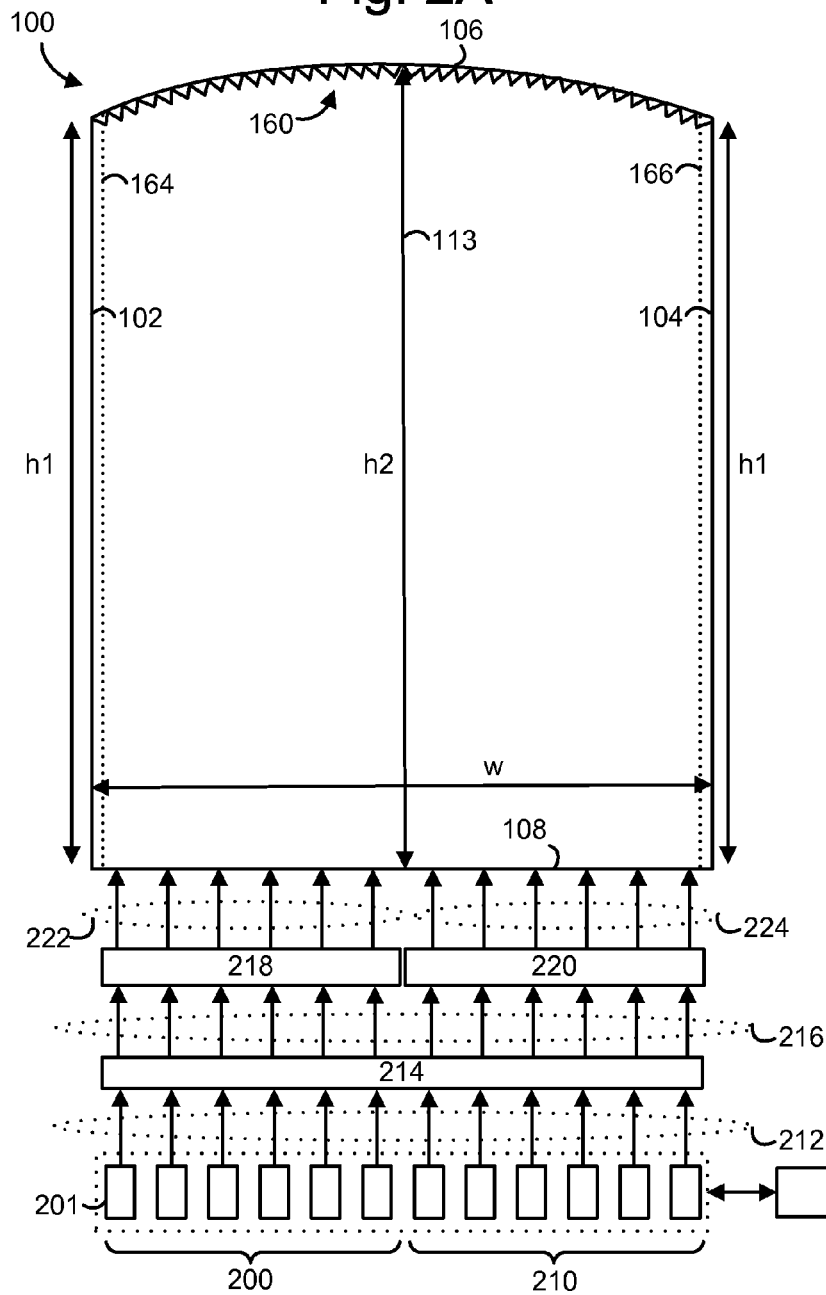
FIG. 2A depicts a light guide device which includes the light guide of FIG. 1A, with input components 260 which include discrete light sources.
Figure 2B:
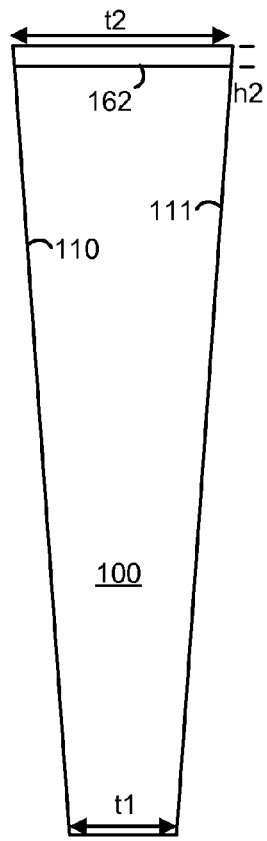
FIG. 2B depicts a cross-sectional view of the light guide of FIG. 2A along the axis 113.

FIG. 2A depicts a light guide device which includes the light guide of FIG. 1A, with input components 260 which include discrete light sources. In an example implementation, the light guide 100 has a height h1 at the sides, a height h2>h1 at the optical axis 113 or meridional plane, and a uniform width w. The birefringent film 164 and 166 is provided at the opposing sides 102 and 104, respectively. The reflective end 106 includes a Fresnelated surface 160 with ridges (e.g., panels or facets) of height h2 (FIG. 2B). At the light-input end 108, input components 260 are provided. These include a number of point light sources such as LEDs (such as example LED 201). The light output from an LED is uncollimated. The light sources can be grouped into a left side 200 and a right side 210, and arranged in one or two rows, for instance (see FIG. 2C). Each light source provides unpolarized light 212 to a linear polarizer 214 which can extend across the area of the light-input end 108. The linear polarizer 214 imparts a single linear polarization, for instance, to the incident unpolarized light. Linearly polarized light 216 is then incident upon a pair of quarter wave plates 218 and 220 which are rotated 90 degrees to one another (that is, their respective optic axes are rotated 90 degrees to one another), in one row of the light-input end 108, such as the top row, and upon another pair of quarter wave plates 219 and 221 which are rotated 90 degrees to one another, in another row of the light-input end 108, such as the bottom row. A polarizer can include the combination of a linear polarizer and a quarter wave plate, for instance.

In one approach (see FIG. 2C), the quarter wave plates 218 and 221 are rotated in the same orientation, and the quarter wave plates 219 and 220 are rotated in the same orientation. The quarter wave plates 218 and 221 can be rotated 90 degrees to the quarter wave plates 219 and 220. The combination of the linear polarizer 214 and one of the quarter wave plates forms a circular polarizer which imparts a circular polarization to the light 212. Further, the polarization of the light which is incident to the light-input end 108 from the left side of the light-input end 108 can be orthogonal to the light which is incident to the light-input end 108 from the right side of the light-input end 108. In one approach, a polarization of the light 222 passed by the quarter wave plate 218 is left-handed (counterclockwise) circular, and the polarization of the light 224 passed by the quarter wave plate 220 is right-handed (clockwise) circular. Similarly, in FIG. 2C, a polarization of light passed by the quarter wave plate 221 is left-handed circular, and the polarization of light passed by the quarter wave plate 219 is right-handed circular. When two rows of quarter wave plates and light sources are used, the polarization of the light passed by the quarter wave plates 218 and 221 can be right-handed circular, and the polarization of the light passed by the quarter wave plates 219 and 220 can be left-handed circular.

Alternatively, the opposite case is true, e.g., a polarization of light passed by the quarter wave plate 221 is right-handed circular, and the polarization of light passed by the quarter wave plate 219 is left-handed circular. When two rows of quarter wave plates and light sources are used, the polarization of the light passed by the quarter wave plates 218 and 221 can be left-handed circular, and the polarization of the light passed by the quarter wave plates 219 and 220 can be right-handed circular.

Each row of quarter wave plates can be associated with one or more rows of LEDs. An array of LEDs can be associated with each quarter wave plate.

Thus, the input components 260 include one or more optical components (e.g., 214, 218) for imparting a first polarization (e.g., right- or left-handed circular) to light from at least one light source 200 before that light enters the light guide. Similarly, one or more optical components are provided for imparting a second polarization (e.g., left- or right-handed circular), which is orthogonal to the first polarization, to light from at least another light source 210 before that light enters the light guide.

The input components 260 of the light guide device can be considered to include a first set of discrete light sources (such as example LED 201), on one side of the light-input end, in one row, a second set of discrete light sources (such as example LED 202), on another side of the light-input end, in the one row, a third set of discrete light sources (such as example LED 203), on the one side of the light-input end, in another row, and a fourth set of discrete light sources (such as example LED 204), on the another side of the light-input end, in the another row. Further, one or more linear polarizers 214 are arranged between the light-input end and the first, second, third and fourth sets of discrete light sources. A first quarter wave plate 218 is arranged between the one or more linear polarizers and the first set of discrete light sources, a second quarter wave plate 220 is arranged between the one or more linear polarizers and the second set of discrete light sources, a third quarter wave plate 219 is arranged between the one or more linear polarizers and the third set of discrete light sources, and a fourth quarter wave plate 221 is arranged between the one or more linear polarizers and the fourth set of discrete light sources. The first and third quarter wave plates have respective optic axes which are similarly oriented, the second and fourth quarter wave plates have respective optic axes which are similarly oriented, and the optic axes of the first and third quarter wave plates are rotated 90 degrees relative to the optic axes of the second and fourth quarter wave plates.

A quarter wave plate ($\lambda/4$ plate), is typically a film and provides circularly polarized light from incident linearly polarized light. More generally, a wave plate or retarder is an optical device that alters the polarization state of a light wave travelling through it. A wave plate works by shifting the phase between two perpendicular polarization components of the light wave. Light with polarization components along both fast and slow axes will emerge from the wave plate in a different polarization state. For instance a quarter-wave plate creates a quarter-wavelength phase shift and can change linearly polarized light to circularly polarized light, or change circularly polarized light to linearly polarized light.

As an alternative to providing two rows of quarter wave plates, with the left- and right-side quarter wave plates in a row being orientated at 90 degrees to each other, it is possible to provide two electrically-controllable or active quarter wave plates orientated at 90 degrees to each other in one row. One possible implementation uses a liquid crystal cell. The way in which the cell operates depends on the liquid crystal used, but we would first pass the LED emission through a linear polarizer at 45° to the vertical then use, e.g., a ferroelectric liquid crystal (whose axis of birefringence can rotate through 90 degrees) to slow down either the horizontal or vertical state by a quarter of a wavelength.

The light sources 200 and 210 can be white, or different colors, and their light hits the sides 102 and 104 at a wide range of angles. When the light guide is a backlight to an LCD panel, the LCD can provide a color display using color filters right underneath the liquid crystal. To accommodate the different wavelengths and/or different incidence angles of the light in the light guide, the birefringent film 164 and 166 can be in the form of a thin film reflector which is designed with many, e.g., hundreds, of layers, using computational techniques to develop a design that does handle all visible wavelengths and the various angles in the same way. This type of design has been done successfully by companies such as 3M Corp., as described by the above-mentioned Weber et al. publication.

In one possible approach, the light guide device operates as a scanning backlight to the LCD panel, in which the arrays of light emitting diodes (LED) are driven by a driving circuit 226 to illuminate pixels of the LCD panel/display. In a scanning backlight mode, the LEDs are sequentially driven (turning on and off) in the scanning direction of a video signal applied to the LCD panel to emit light at an initial time of one frame interval while shutting off the light in the remaining time interval. This prevents blur by eliminating the influence of the previous display pixel on the next display pixel. A user's heads move sideways more than up or down so it is more useful to scan rays in the horizontal plane than in elevation.

With such a scanning backlight, when light is to be ejected from the surface 110 at angles other than perpendicular, rays travel within the light guide at an angle to its sides. Consequently, some rays hit the side and are reflected in an unintended direction while at the opposite edge, an area is left devoid of illumination in the manner of a shadow as mentioned previously. This problem is overcome by injecting light rays at equal but opposite angles to the meridional plane using the left- and right-side light source 200 and 210, respectively, so that the shadow left by one set of rays is filled by the reflected rays of the other set, as described in Travis, A. R. L. et al., "Collimated light from a waveguide for a display backlight," Optics Express, vol. 17, no. 22, p. 19714-19719, Oct. 15, 2009, incorporated herein by reference. A further advantage is achieved as described herein by using polarized light and a polarization-switching film on the sides of the light guide so that the image on the display is visible only in an intended direction to protect privacy and to avoid degradation of a 3-D image.

As provided herein, the polarization states of the light sources on the opposing sides of the light-input end of the light guide are made orthogonal. Light from half of the light sources on one side of the light guide is made circularly polarized, (right-handed or clockwise) and light from the other half of the light sources on another side of the light guide is made circularly polarized in the opposite direction (e.g., anti-circular, left-handed or counterclockwise). The light from the one side is orthogonally polarized relative to the light from the other side because they have opposite circular polarizations. Although a specific example has been provided in which first and second types of circularly polarized light are input to the light-guide, it is possible that, more generally, first and second types of polarized light can be input, such as first and second types of linearly polarized light.

FIG. 2B depicts a cross-sectional view of the light guide of FIG. 2A along the axis 113. The light guide 100 is wedged-shaped in this example with opposing faces which are non-parallel and not at a right angle to the light-input end. The light guide, when in the form of a wedge, can be considered to be a cuboid, like a cube but not square. It can be wedge-shaped where the reflective end is twice as thick as the light input end, in one possible implementation (t2=2×t1). Front 110 and rear 111 surfaces of the light guide are depicted. The light input end may have a thickness of t1 and the reflective end may have a thickness of t2>t1. An example ridge 162 of the Fresnelated reflective end 160 is depicted having a height h2.

Figure 2C:
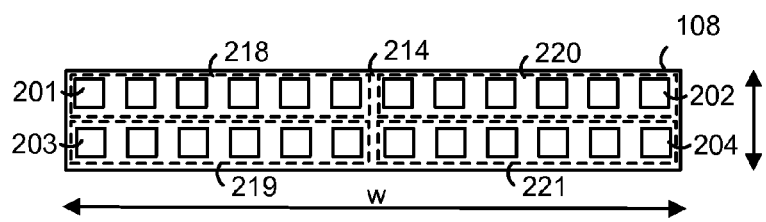
FIG. 2C depicts an end view of the light guide device of FIG. 2A.

FIG. 2C depicts an end view of the light guide device of FIG. 2A. The quarter wave plates 218-221 and linear polarizer 214 are provided as discussed previously. A light source provided by a lower row of LEDs (depicted by the six squares encompassed by the quarter wave plate 219) is at least one additional light source on one side of the light-input end of the light guide. A light source provided by a lower row of LEDs (depicted by the six squares encompasses by the quarter wave plate 221) is at least another additional light source on the other side of the light-input end. The quarter wave plate 219 and the linear polarizer 214 are one or more optical components for imparting a second polarization (the same polarization imparted by the quarter wave plate 220 and the linear polarizer 214) to light from the at least one additional light source before the light from the at least one additional light source enters the light guide. Similarly, the quarter wave plate 221 and the linear polarizer 214 are one or more optical components for imparting a first polarization (the same polarization imparted by the quarter wave plate 218 and the linear polarizer 214) to light from the at least another additional light source before the light from the at least another additional light source enters the light guide.

It is desirable for light which does not hit the sides 102 and 104 and which passes out of the light guide into an LCD, for instance, to cover a full range of angles in azimuth, both negative and positive. To achieve this, we can provide discrete light sources which provide light which is polarized to one polarization state running equal distances from either side of the center of the light guide at the light-input end (e.g., on the top row on the left side and on the bottom row on the right side). And, we can provide the same for light which fills in the shadows by reflecting off sides 102, 104 so these discrete light sources which provide light which is polarized to the orthogonal polarization state also run equal distances from either side of the center of the light guide at the light-input end (e.g., on the top row on the right side and on the bottom row on the left side).

Note that with one or two rows of discrete lights at the light-input end, the light guide will provide a 1-D image, that is, one row of pixels. However, the principles illustrated can be extended to a 2-D light source such as provided by a video projector, to allow the light guide to provide a 2-D or 3-D image, as discussed next.

FIG. 3A depicts a light guide device which includes a rectangular light guide, and input components 360 which include one or more transparent rods. In contrast to providing discrete light sources such as LEDs which are arranged along the light-input end 108 of the light guide 100 as depicted in FIG. 2A, it is possible to use a transparent rod 300, such as a cuboid shaped rod, which is adjacent to the light-input end 308 of a light guide 310, and which carries a 2-D image from a video projector. A cuboid is a shape with six faces which can be, but need not be, all at right angles to one another. A cuboid whose faces are all at right angles to one another is right cuboid. The use of such a transparent rod in a cuboid light guide is discussed in U.S. Pat. No. 6,847,488, entitled "Far-field display," issued Jan. 25, 2005 to A. R. L. Travis et al., incorporated herein by reference.

Furthermore, a cuboid light guide having parallel ends 303 and 308 can be used as an alternative to a wedge-shaped light guide with a rounded or arcuate end, such as in FIG. 2A, to set up parallel rays of light in a light guide. Advantages of this design include the ability to scan light up and down as well as side to side, and there is no lens aberration since the far end 303 is not curved. The cuboid can be a right cuboid such that it is not wedge shaped, but all opposing sides are parallel.

The light guide device 302 includes a right cuboid light guide 310 having a light-input end 308 and an opposing far end 303, and opposing sides 304 and 307 with birefringent film layers 305 and 306, respectively. The light guide 310 has a front surface 301 and an opposing rear surface 302 (FIG. 3B). The input components 360 include a transparent rod 300 which includes a linear grating along a length of the rod. The grating can include reflective surfaces (such as surface 311) arranged along the length of the transparent rod 300. The transparent rod 300 can be made by providing spaced apart square sheets of highly transparent float glass (such as surface 311) suffused with glue of a refractive index chosen so that the dielectric interface between glue and glass is weakly reflecting, then polishing to form a cuboid rod as depicted.

The transparent rod can be used to provide injected rays which are already collimated as they enter the light-input end 308, so that the end 303 of the light-guide which opposes the light-input end does not have to be a curved reflective mirror. Thus, we can create a collimated input by placing a cuboid rod against the light-input edge, embossing a weak diffraction grating against the side of the rod which next to the light-input edge of the waveguide, or throughout the cross-section of the rod, and pointing a light source such as a laser or video projector into the end of the rod so that light regularly reflects off the diffraction grating and into the light-guide, in a collimated manner in a direction vertically toward the opposing end. See U.S. Pat. No. 6,847,488 for further details. An embodiment that uses a laser has the advantage in that the cost of lasers is getting cheaper and no collimating mirror at the reflective end of the light-guide is needed, so an aberration which could be introduced by the collimating mirror is avoided.

FIG. 3B depicts a cross-sectional view of the light guide of FIG. 3A, showing the front surface 301 and the opposing rear surface 302.

FIG. 3C depicts light rays in the transparent rod of the FIG. 3A, including a ray 341 from one or more video projectors and rays (such as ray 342) which enter the light-input end 308 of the light guide 310 via a transition region 330. The light source 340 inputs light to an end of the transparent rod 300, where the light regularly reflects off the linear grating and toward the light-input end of the light-guide in a collimated manner.

In another approach, instead of being made out of squares (or other rectangles) of float glass, the gratings in the rod are created by configuring the rod as a cuboid of pure glass, and embossing it with a diffraction grating. In either case, a linear grating is provided along a length of the rod, and a light source inputs light to an end of the transparent rod which regularly reflects off the diffraction grating and toward the light-input end of the light-guide in a collimated manner. In another approach, photosensitive particles are mixed into the glass and a volume hologram is created within the glass by illuminating it with a pair of laser beams.

FIG. 3D1 depicts an end view of the light guide device of FIG. 3A, showing one transparent rod and two light sources. Portions of the reflective surfaces (such as surface 311) which extend along the transparent rod are depicted. In this approach, light from two light sources is input to the rod 300. Light from a light source 340 is polarized using a linear polarizer 343 and a quarter wave plate 342, while light from a light source 372 is polarized orthogonally to the light from the light source 340 using a linear polarizer 344 and a quarter wave plate 346. Appropriate optical components such as lenses are used to route the light to the end of the rod.

The light sources 340 and 372 can be video projectors which output same images, under the control of a driver control circuit 350. One of the video projectors can be activated at a given time or both can be activated concurrently and in synchronism, e.g., outputting substantially the same images. A 3-D image can be presented to the user such as by projecting the same scene which is depicted from slightly different perspectives. Thus, the images from the light source 340 can be of a scene with one perspective and the images from the light source 372 can be of the scene with a slightly different perspective. Or, a 3-D image can be presented to the user such as by projecting the same scene which is depicted from the same perspective, such as by projecting the same video images.

A video projector can be provided, e.g., by a 2-D LCD micro-display. Each pixel of the micro-display can be analyzed as a point light source. The light guide can be used to provide a flat-panel projection display by focusing the video projectors into one end of the transparent rod 300 and placing the transparent rod adjacent and parallel to the light-input end 308 of the light guide with such an orientation that light from the video projectors is ejected perpendicularly from the transparent rod and into the light guide.

FIG. 3D2 depicts an end view of the light guide device of FIG. 3A, showing one transparent rod and one light source. The one light source 340 provides light via a lens 361 to the polarizer formed by 344 and 346 and to the polarizer formed by 343 and 342.

FIG. 3E depicts an end view of the light guide device of FIG. 3A, showing two transparent rods 300 and 370.

FIG. 3F depicts a perspective view of the two transparent rods of FIG. 3E, showing a separate light source for each rod. Here, the video projector 340, linear polarizer 343 and quarter wave plate 342 provide light with a first polarization into the rod 300, and the video projector 372, linear polarizer 344 and quarter wave plate 346 provide light with a second, orthogonal polarization into the rod 370, under the control of the driver circuit 350.

The axis of the video projectors 340 and 372 can be at an angle to both the horizontal and the vertical so that no ray from the video projectors travels parallel to the rod axis. Furthermore, a pair of front-silvered mirrors can be placed at opposite sides of the transition region 330, and the video projectors should evenly illuminate both the transparent rod input and the three images of the transparent rod input which are presented to the video projector through the front-silvered mirrors. Injected light travels along the transparent rod, being reflected from the sides, so that no light is lost, and being partly reflected at each mirror interface, where it leaves the rod and enters the light guide.

The polarizers can alternatively be provided between the rod and the light-input end of the light guide, similar to the components 214, 218 and 220 depicted in FIG. 2A. For example, a linear polarizer and a quarter wave plate can be provided between each of the rods and the light-input end of the light guide.

FIG. 3G depicts a perspective view of the two transparent rods of FIG. 3E, showing a single light source for both rods. Here, the video projector 340 or other light source provides light for both of the rods 300 and 370 and is thus common to the first and second transparent rods. Light from the video projector 340 is provided via an optical component 376 to the rod 300 via linear polarizer 343 and quarter wave plate 342, and to the rod 370 via linear polarizer 372 and quarter wave plate 344.

Figure 4A:
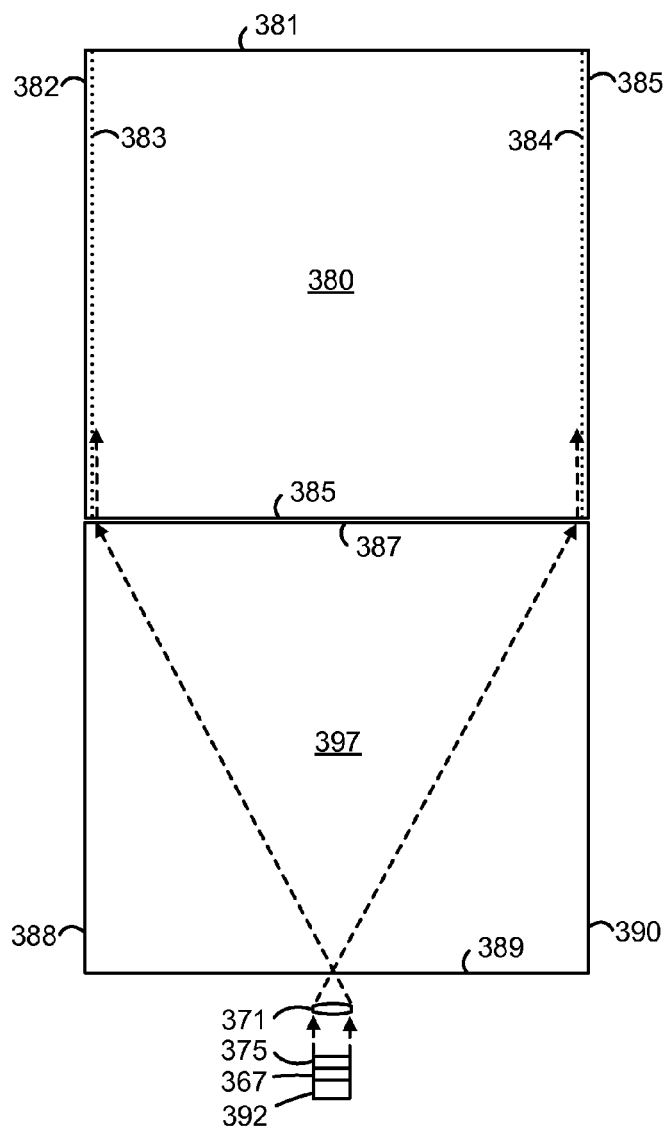
FIG. 4A depicts a light guide device which includes a wedge-shaped light guide and two rectangular slabs to provide input light to the wedge-shaped light guide.
Figure 4A:
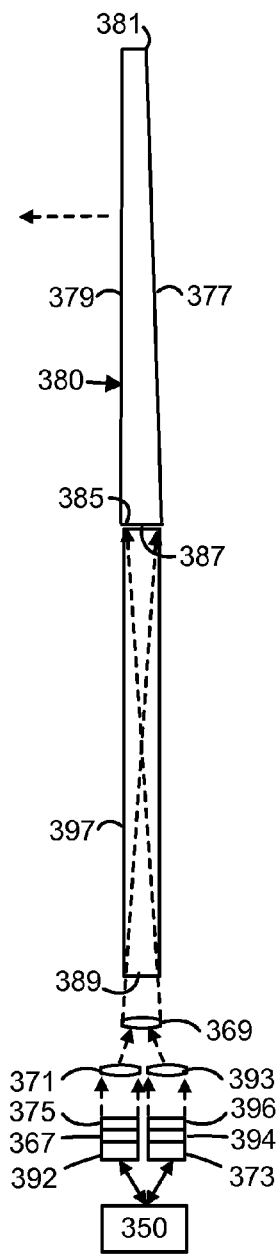

FIG. 4A depicts a light guide device which includes a wedge-shaped light guide and two rectangular slabs to provide input light to the wedge-shaped light guide. In this approach, a separate slab light guide 397, which can be a right cuboid, is adjacent to and butted against the thick end 385 of a wedge shaped light guide 380. The slab light guide 397 includes opposing sides 388 and 390, a light input end 389 and a light output end 387. The light guide 380 includes opposing sides 382 and 385 with birefringent film layers 383 and 384, respectively, a light input end 385 and an opposing end 381. Light from a light source 392 such as a video projector is input via a lens 371 to the slab light guide 397, fans out in the slab light guide and enters a light-input edge 385 of the light guide 380 in a collimated manner, as indicted by the dashed line arrows. In one approach, the light from the light guide is polarized using a linear polarizer 367 and a quarter wave plate 375.

FIG. 4B1 depicts a cross-sectional view of the light guide device of FIG. 4A, where one rectangular slab with two light sources are provided. A front surface 379 and an opposing back surface 377 are depicted. In one approach, the opposing front and back surfaces are non-parallel, the front surface is at a right angle to the light-input end 385 and the back surface is not at a right angle to the light-input end 385. In one possible approach which uses a single slab light guide 397, two light sources 392 and 373 are used. As before, the light sources 392 and 373 can be video projectors which output the same images, under the control of a driver control circuit 350. One of the video projectors can be activated at a given time or both can be activated concurrently and in synchronism, e.g., outputting substantially the same images.

Light from the light source 392 is provided to the light input end 389 of the single slab light guide 397 with a first polarization via a linear polarizer 367, a quarter wave plate 375 and lenses 371 and 369. Similarly, light from the light source 373 is provided to the light input end 389 of the single slab light guide 397 with a second, orthogonal polarization via a linear polarizer 394, a quarter wave plate 396 and lenses 393 and 369. After reflecting within the light guide 380, light exits the front surface 379.

FIG. 4B2 depicts a cross-sectional view of the light guide device of FIG. 4A, where one rectangular slab with one light source is provided. The one light source 392 provides light via a lens 366 to the polarizer formed by 367 and 375 and to the polarizer formed by 394 and 396.

FIG. 4C depicts a cross-sectional view of the light guide device of FIG. 4A, where two rectangular slabs with respective light sources are provided. Here, a second slab light guide 398 is provided adjacent to the first slab light guide 397. Light from the light source 392 is provided to the light input end of the slab light guide 398 with a first polarization via the linear polarizer 367, the quarter wave plate 375 and a lens 371. Similarly, light from the light source 373 is provided to the light input end of the slab light guide 397 with a second, orthogonal polarization via the linear polarizer 394, the quarter wave plate 396 and a lens 393.

The polarizers can alternatively be provided between the lens 371 and 393 and the light-input end of the slab light guides 398 and 397. For example, a linear polarizer and a quarter wave plate can be provided between each of the lenses 371 and 393 and the light-input ends of the slab light guides 398 and 397.

FIG. 4D depicts a cross-sectional view of the light guide device of FIG. 4A, where two rectangular slabs with a single light source are provided. Here, light from the single light source 392 is provided to the light input end of both of the slab light guides 398 and 397. The light source 392 is thus common to both the first and second slab light guides. The light is provided to the slab light guide 398 with a first polarization via lenses 366 and 371, the linear polarizer 367 and the quarter wave plate 375. Similarly, the light is provided to the slab light guide 397 with a second, orthogonal polarization via lenses 366 and 371, the linear polarizer 394 and the quarter wave plate 396.

Figure 5:
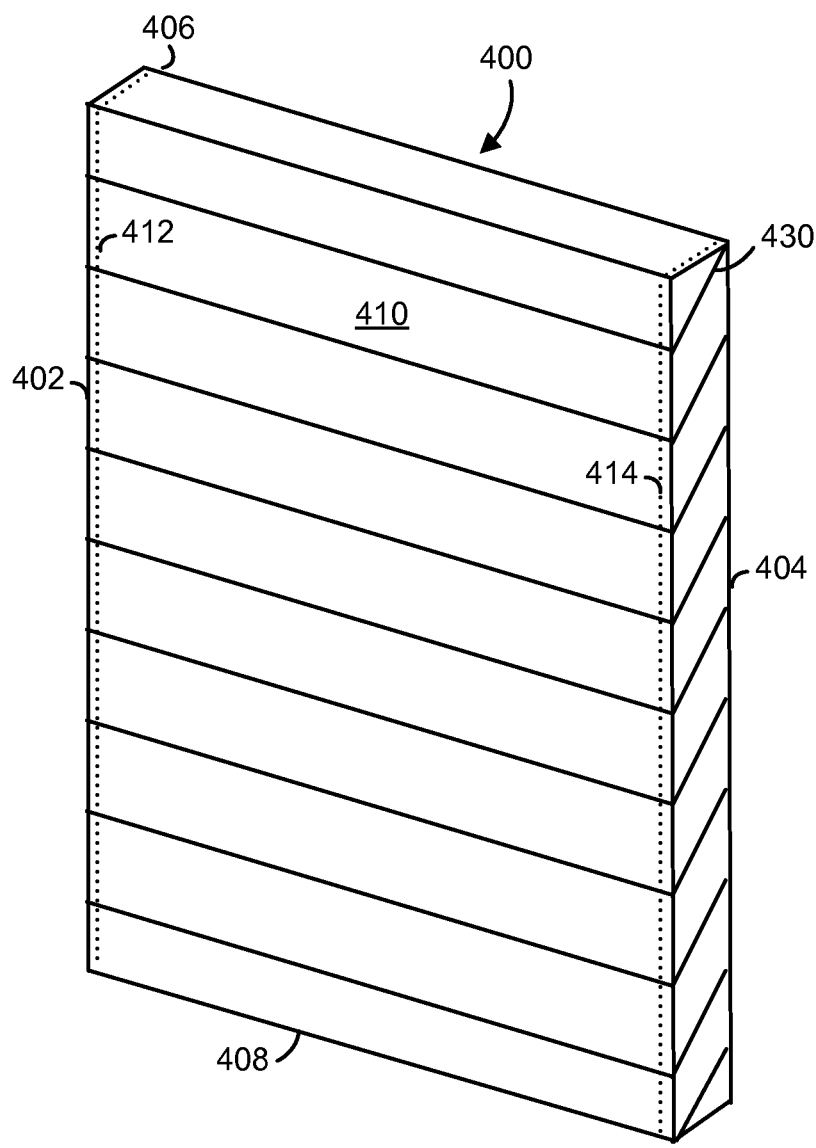
FIG. 5 depicts a rectangular light guide with a grating.
Figure 6A:
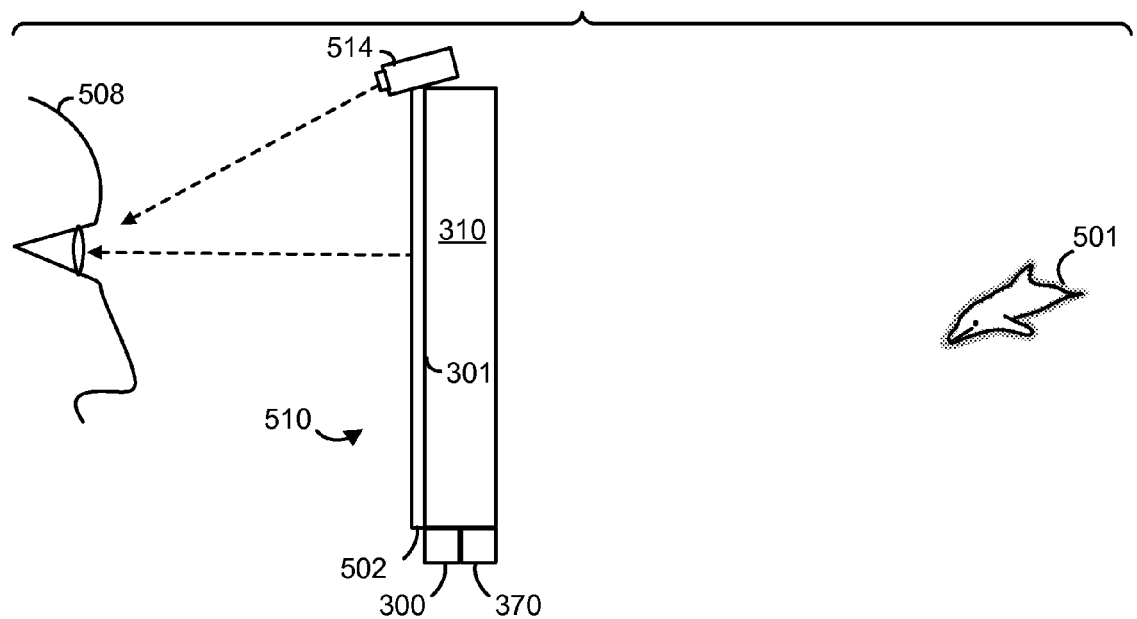
FIG. 6A depicts a use of the light guide device of FIG. 3A as a head-up display.

FIG. 5 depicts a rectangular light guide with a grating. This is a possible implementation of the light guide 310 or 380, for instance. The cuboid light guide 400 can be formed in a similar manner as the transparent rod 300 and includes an example reflective surface 430 of a grating. In one implementation, the cuboid light guide 400 is a right cuboid which includes a light-input end 408, an opposing, parallel far end 406, a front face or surface 410, and opposing sides 402 and 404 which are provided with a birefringent film 412 and 414, respectively. FIG. 6A depicts a use of the light guide device of FIG. 3A as a head-up display. A head up display can be used, e.g., in an automobile, airplane, marine craft or other application. The head up display typically is not worn by the user but is attached to a fixed object such as the windshield of an automobile. In the light guide device 510, the light guide 310 and transparent rods 300 and 370 which input light to the light guide 310 as discussed previously are provided. The front surface 301 of the light guide 310 passes light to the user's eyes to represent a virtual image 501 such as a dolphin. The virtual image can be focused at several feet away from the user, for instance.

When the circularly polarized light from the transparent rods enters the light guide 310, some of the rays will hit the reflective end, bounce off the reflective end, and reach the long edges where there is a birefringent film. These rays are reflected and processed by the birefringent film, go back into the light guide, and finally exit the front surface 301 of the light guide. Specifically, when the rays reflect off the birefringent film, the polarization state is switched to a state which is orthogonal to the current state. That is, incident light with a right-handed circular polarization is switched to a left-handed circular polarization upon reflection from the birefringent film, and incident light with a left-handed circular polarization is switched to a right-handed circular polarization upon reflection from the birefringent film. Thus, when we make the illumination at the light-input end circularly polarized, the light emerging from the front surface 301 of the light guide will also be circularly polarized.

To provide linearly polarized light, a rear polarizer 502 such as a quarter wave plate can be provided which converts the circularly polarized light to linearly polarized light which is seen by the user 508. For example, if the quarter wave plate converts right-handed circularly polarized light to the horizontal linear state of polarization, then it has to convert left-handed circularly polarized light to the vertical linear state of polarization. With linear polarization, or plane polarization, of electromagnetic radiation, the electric field vector or magnetic field vector is confined to a specified plane along the direction of propagation. So, one of the directions will be passed to the user and the other blocked, thereby providing privacy of viewing.

If we think of three dimensions, the light-input end of the light guide is one dimension. The rays hit the film on the sides, in a second dimension, and are orthogonally switched. Then there is the exit surface 301 which can be a horizontally-facing plane, in a third dimension, where light is bouncing off each of the three axes of the three dimensional system in turn. All of the light bounces off of the reflective or mirrored end which is distant to the light sources before it reaches the birefringent film on the sides.

By using the birefringent film to switch the polarization states, this eliminates the shadows because the reflected light fills in the gaps left by the light that does not bounce off the sides. The main beam never gets to hit the sides and it just travels through the wave guide and comes out of the surface and creates light traveling at an angle. In the area that is not illuminated, in a shadow or gap, the other rays that are going in the symmetrically opposite direction do bounce off the sides and have the polarization state rotated so that they can emerge through the rear polarizer 502. The ones that have bounced off the sides will, by symmetry, fill in the shadows of the first set of the ones that don't bounce off the sides. The ones that don't bounce off the sides of the second set won't have the polarization rotated and won't get through the polarizer. We thus use the rear polarizer 502 to select all the desired rays after the light exits the light guide 100.

For a light source with a first polarization, any light ray that is not reflected from the sides of the light guide are absorbed by the rear polarizer 502 because they are all set up in a polarization state where they will get absorbed if the polarization state is left unchanged. The reflected rays from the sides are the only rays that get through the polarizer 502 because those reflected rays have their polarization state changed. On the other hand, for the light source with the second, orthogonal polarization, the reflected rays from the sides are absorbed by the rear polarizer 502 and the rays that are not reflected from the sides are passed by the rear polarizer.

By eliminating the shadows, we can use all of the front surface 301 of the light guide as a display. When used as a backlight, for instance, we avoid the need to make the backlight bigger than the LCD so the shadow never spreads into the region that the user is looking. Cost and size can therefore be decreased.

This shadow elimination technique applies to backlights where the goal is to produce collimated light, and can use LED, laser or video projector light sources. Further, the concept is relevant to devices which scan light.

The light guide device 510 can further include an eye-tracking component 514 such as a camera to track a location of the user's eye so that the position of the virtual image can be adjusted based on a direction in which the user is looking. In an example approach, the eye-tracking component 514 includes an infrared (IR) emitter which emits IR light toward the eye, and an IR sensor which senses reflected IR light. The position of the pupil can be identified by known imaging techniques such as detecting the reflection of the cornea. For example, see U.S. Pat. No. 7,401,920, titled "Head mounted eye tracking and display system" issued Jul. 22, 2008 to Ophir et al., incorporated herein by reference. Such techniques can locate a position of the center of the eye relative to the tracking camera. Generally, eye tracking involves obtaining an image of the eye and using computer vision techniques to determine the location of the pupil within the eye socket. Other eye tracking techniques can use arrays of photo detectors and LEDs. Typically, it is sufficient to track the location of one of the user's eyes since the eyes move in unison. However, it is also possible to track each eye separately and use the location of each eye to determine the location of the virtual image.

Note that the light guide could be rotated in any orientation, so that the input components could be on any side of the light guide and need not be on the bottom, as depicted.

Figure 6B:
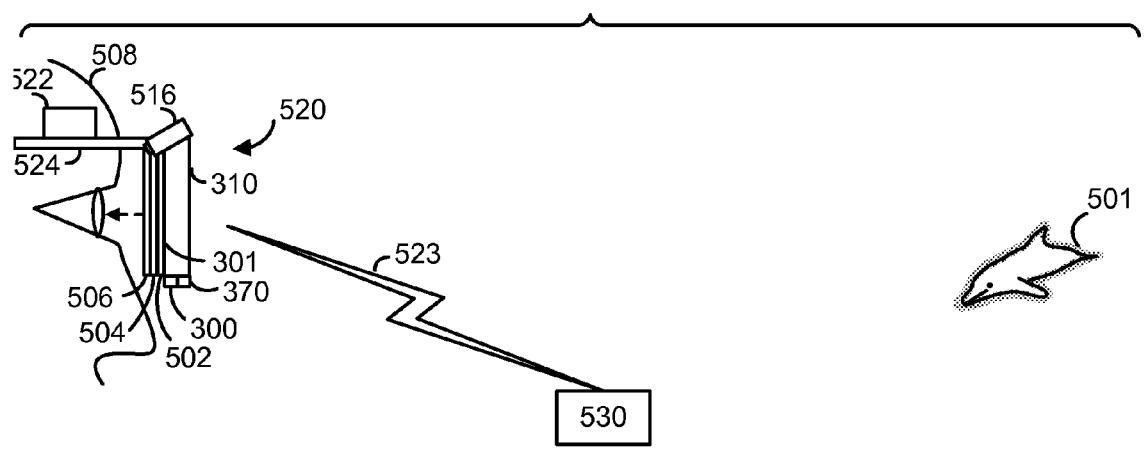
FIG. 6B depicts a use of the light guide device of FIG. 3A as a head-mounted display.

FIG. 6B depicts a use of the light guide device of FIG. 3A as a head-mounted display. The light guide device 520 includes the light guide 310 and transparent rods 300 and 370 attached to a user-worn frame 524 similar to conventional eyeglass frames, in one approach. A separate light guide device can be provided for each eye, for instance. Further, an eye-tracking camera 516, similar to the camera 514, can be provided to identify a location of the user's eye with respect to the frame, and to adjust the location of the virtual image accordingly. Moreover, the direction in which the user 508 is looking can be determined by tracking a position of the user's head using an inertial measurement unit 522 which is attached to the user's head such as via the frame 524. The inertial measurement unit can include a three-axis magnetometer, a three-axis gyro and a three-axis accelerometer, for sensing position, orientation, and sudden accelerations of the head mounted display.

In one approach, the inertial measure unit 522 and/or the eye-tracking camera 516 communicate wirelessly via a wireless link 523 to a computing device 530. In response, the computing device determines where to display the virtual image 501 in the user's field of view and communicates corresponding instructions to the video projectors. For example, it may be desired to position the virtual image so that it appears to be emerging from a television set which is in a known location in a room. In response to the instructions, appropriate light sources are provided to the light guide.

The light guide device 520 includes an LCD panel 504 arranged to receive linearly polarized light from the linear polarizer 502. A front polarizer 506 of the LCD can also be provided. As mentioned, the rear polarizer discriminates between the two groups of rays that emerge from the wedge, that is, between the right- and left-handed circularly polarized rays. It discriminates to select the ones that we want. The reflected rays have bounced off the side and had their polarization state switched to the unselected polarization so that the user will not see them because they will be absorbed by the rear polarizer of the LCD. Pixels of the LCD can be controlled to create an image which is seen by the user.

Figure 6C:
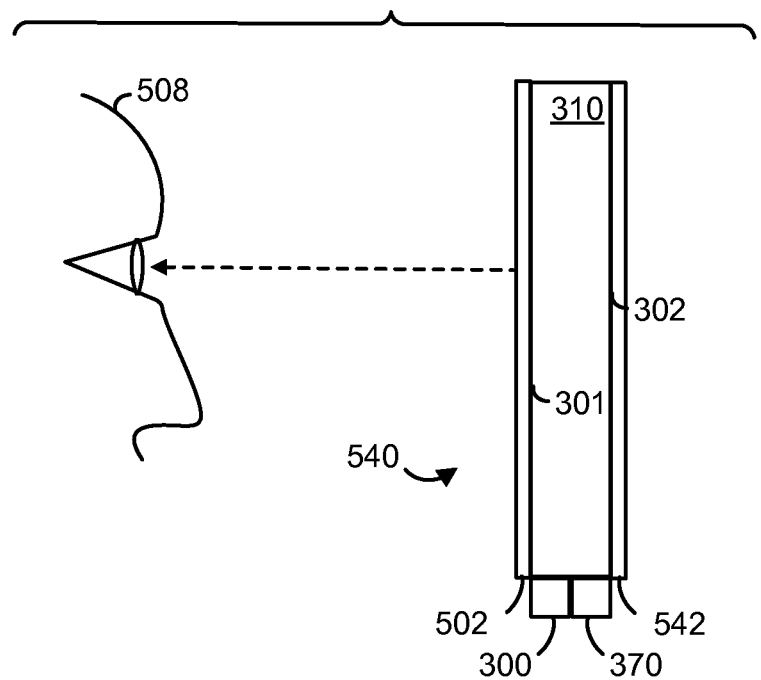
FIG. 6C depicts a use of the light guide device of FIG. 3A with a mirror on the back surface.

FIG. 6C depicts a use of the light guide device of FIG. 3A with a mirror on the back surface. In this approach, a mirror 542 is provided on the back surface 302 of the light guide 310 to reflect light back into the waveguide, toward the front surface 301, thereby increasing the efficiency.

Figure 6D:
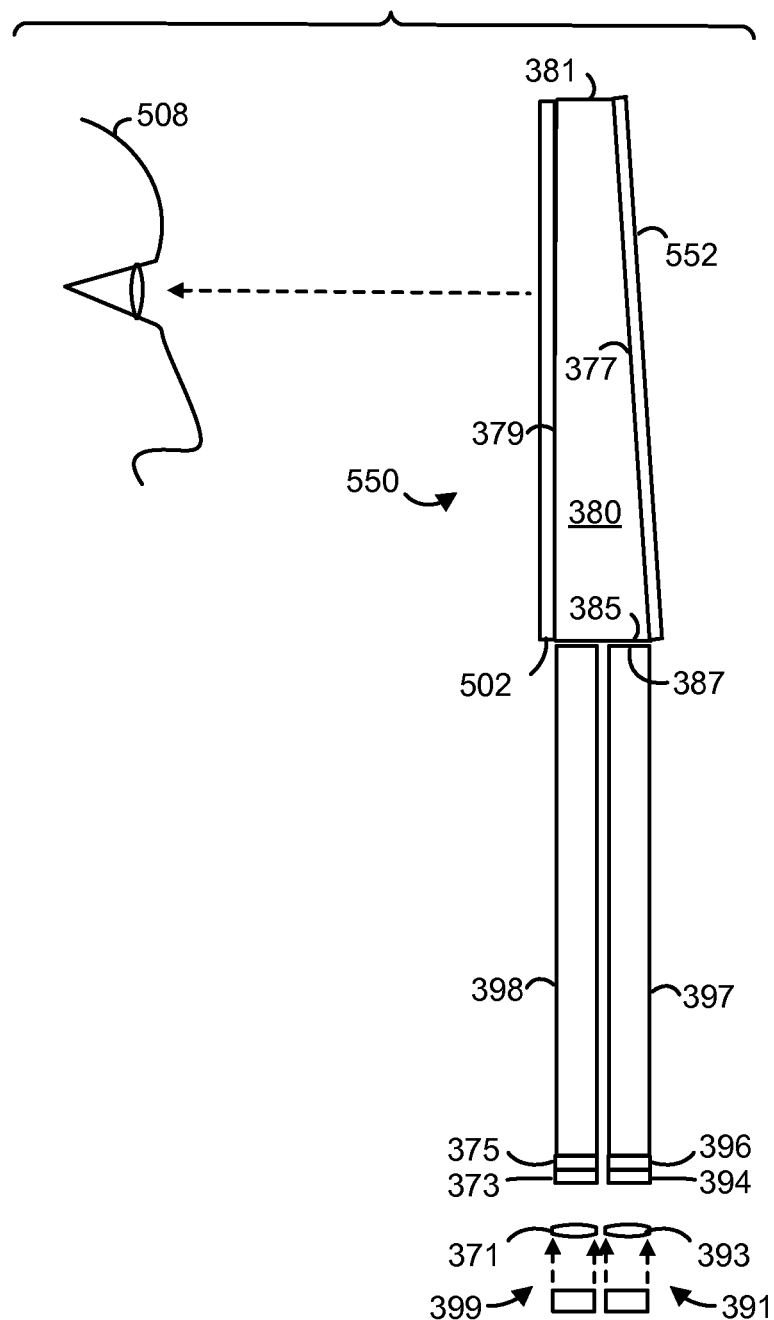
FIG. 6D depicts a use of the light guide device of FIG. 4A as a head-up display.

FIG. 6D depicts a use of the light guide device of FIG. 4A as a head-up display. In the light guide device 550, a mirror 552 is optionally provided on the back surface of the light guide 380.

Accordingly, it can be seen that a light guide device is presented which can illuminate a liquid crystal panel with collimated light so that the image on the panel can only be seen from one position at any instant. An advantage over conventional backlights which emit light in all directions is that less power is needed to make visible to a user the image on a liquid crystal display placed in front of the backlight. Furthermore, the user has privacy because no one can see the display but them. A derivative of this is the scanning backlight, where the ability to scan the direction of collimation means that illumination can continually be directed to the user's eyes as they move around, and separate images can be displayed in turn to each eye so that the user sees an autostereoscopic (3-D) image.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A light guide device, comprising:
a light guide, the light guide comprising a light-input end and an opposing end, parallel opposing left and right sides joined to the light-input end and the opposing end, opposing front and back surfaces joined to the light-input end and the opposing end, and a birefringent film on the opposing left and right sides, the birefringent film switches a polarization of incident light; and input components at the light-input end, the input components provide light with a first polarization to the light-input end and light with a second polarization, orthogonal to the first polarization, to the light-input end.

2. The light guide device of claim 1, wherein:
the first polarization is right-handed circular polarization;
the second polarization is left-handed circular polarization; and
the birefringent film switches incident light with the right-handed circular polarization to left-handed circular polarization, and switches incident light with the left-handed circular polarization to right-handed circular polarization.

3. The light guide device of claim 1, wherein the input components include:
first and second sets of discrete light sources;
a first polarizer which imparts the first polarization arranged between the first set of discrete light sources and the light-input end; and
a second polarizer which imparts the second polarization arranged between the second set of discrete light sources and the light-input end.

4. The light guide device of claim 1, wherein:
the input components include first and second transparent rods adjacent to the light-input end, each of the first and second transparent rods having a grating along a length of the transparent rod; and
the light guide device further comprises:
a light source and associated polarizer which provides light having the first polarization to an end of the first transparent rod to provide collimated light having the first polarization to the light-input end; and
a light source and associated polarizer which provides light having the second polarization to an end of the second transparent rod to provide collimated light having the second polarization to the light-input end.

5. The light guide device of claim 1, wherein:
the input components include a transparent rod adjacent to the light-input end, the transparent rod having a grating along a length of the transparent rod; and
the light guide device further comprises:
a light source;
one polarizer which provides light having the first polarization to an end of the transparent rod to provide collimated light having the first polarization to the light-input end; and
another polarizer which provides light having the second polarization to the end of the transparent rod to provide collimated light having the second polarization to the light-input end.

6. The light guide device of claim 1, wherein:
the input components include first and second transparent rods adjacent to the light-input end, each of the first and second transparent rods having a grating along a length of the transparent rod; and
the light guide device further comprises:
a light source common to the first and second transparent rods;
one polarizer which provides light having the first polarization to an end of the first transparent rod to provide collimated light having the first polarization to the light-input end; and
another polarizer which provides light having the second polarization to an end of the second transparent rod to provide collimated light having the second polarization to the light-input end.

7. The light guide device of claim 1, wherein:
the input components include first and second slab light guides adjacent to the light-input end; and
the light guide device further comprises:
a light source and associated polarizer which provides light having the first polarization to an end of the first slab light guide to provide collimated light having the first polarization to the light-input end; and
a light source and associated polarizer which provides light having the second polarization to an end of the second slab light guide to provide collimated light having the second polarization to the light-input end.

8. The light guide device of claim 1, wherein:
the input components include a slab light guide adjacent to the light-input end; and
the light guide device further comprises:
a light source;
one polarizer which provides light having the first polarization to an end of the slab light guide to provide collimated light having the first polarization to the light-input end; and
another polarizer which provides light having the second polarization to the end of the slab light guide to provide collimated light having the second polarization to the light-input end.

9. The light guide device of claim 1, wherein:
the input components include first and second slab light guides adjacent to the light-input end; and
the light guide device further comprises:
a light source common to both the first and second slab light guides;
one polarizer which provides light having the first polarization to an end of the first slab light guide to provide collimated light having the first polarization to the light-input end; and
another polarizer which provides light having the second polarization to an end of the second slab light guide to provide collimated light having the second polarization to the light-input end.

10. The light guide device of claim 1, further comprising:
a linear polarizer arranged to receive light which exits from the front surface, the linear polarizer changes a circular polarization of the exiting light to a linear polarization.

11. The light guide device of claim 10, further comprising:
a liquid crystal display arranged to receive light which exits from the linear polarizer, and to provide a display visible to a user.

12. The light guide device of claim 1, wherein:
the light guide is used for making a display with a virtual image.

13. The light guide device of claim 1, wherein:
the light-guide is part of a head mounted device.

14. The light guide device of claim 13, wherein:
the head mounted device tracks a position of a user's head.

15. The light guide device of claim 1, wherein:
the light-guide is part of a head up display.

16. A light guide device, comprising:
a light guide, the light guide comprising a light-input end and an opposing end, parallel opposing left and right sides joined to the light-input end and the opposing end, opposing front and back surfaces joined to the light-input end and the opposing end, and a birefringent film on the opposing left and right sides, the birefringent film switches a polarization of incident light;
first and second transparent rods adjacent to the light-input end, each of the first and second transparent rods having a grating along a length of the transparent rod;

at least one light source;
a first polarizer which imparts a first polarization to light from the at least one light source and provides the light having the first polarization to an end of the first transparent rod to provide collimated light having the first polarization to the light-input end; and
a second polarizer which imparts a second polarization, orthogonal to the first polarization, to light from the at least one light source and provides the light having the second polarization to an end of the second transparent rod to provide collimated light having the second polarization to the light-input end.

17. The light guide device of claim 16, wherein:
the at least one light source comprises a video projector.

18. The light guide device of claim 16, wherein:
the first polarization is right-handed circular polarization;
the second polarization is left-handed circular polarization; and
the birefringent film switches incident light with the right-handed circular polarization to left-handed circular polarization, and switches incident light with the left-handed circular polarization to right-handed circular polarization.

19. A light guide device, comprising:
a light guide, the light guide comprising a light-input end and an opposing end, parallel opposing left and right sides joined to the light-input end and the opposing end, opposing front and back surfaces joined to the light-input end and the opposing end, and a birefringent film on the opposing left and right sides, the birefringent film switches a polarization of incident light;
first and second slab light guides adjacent to the light-input end;
at least one light source;
a first polarizer which imparts a first polarization to light from the at least one light source and provides the light having the first polarization to an end of the first slab light guide to provide collimated light having the first polarization to the light-input end; and
a second polarizer which imparts a second polarization, orthogonal to the first polarization, to light from the at least one light source and provides the light having the second polarization to an end of the second slab light guide to provide collimated light having the second polarization to the light-input end.

20. The light guide device of claim 19, wherein:
the first polarization is right-handed circular polarization;
the second polarization is left-handed circular polarization; and
the birefringent film switches incident light with the right-handed circular polarization to left-handed circular polarization, and switches incident light with the left-handed circular polarization to right-handed circular polarization.

* * * * *